3,086,840
URANIUM RECOVERY PROCESS
John C. Hillyer and Loy D. Sneary, Bartlesville, Okla., assignors to Phillips Petroleum Company, a corporation of Delaware
No Drawing. Filed Jan. 20, 1958, Ser. No. 709,743
9 Claims. (Cl. 23—14.5)

This invention relates to a method of recovering uranium from ore. In another aspect it relates to a method of concentrating uranium by extraction of uranium-containing solutions. In still another aspect this invention relates to a method of extracting uranium-containing complex anions from dilute aqueous solution for further purification and concentration of uranium.

In the processing of uranium-containing ores to form uranium concentrate meeting the requirements of the Atomic Energy Commission, techniques of hydrometallurgical recovery have been developed which involve solubilizing uranium in aqueous media in the form of complex anions such as $UO_2(SO_4)_2^{-2}$ and $UO_2(SO_4)_3^{-4}$. Uranium-containing ores are finely crushed and leached with an aqueous solution of an acid such as sulfuric acid to form the soluble anions. Anion exchange resins can then be used in column operation to absorb uranium-containing aions from clarified solutions or, alternatively, the anions can be recovered by solvent extraction processes. The solvent extraction techniques have several advantages over ion exchange resins in that the process can be completely continuous and the solutions can be treated without previously clarifying them, as by filtering, centrifuging or the like. On the other hand, an ion exchange resin can be readily separated from the aqueous solution after absorption of the uranyl complex avoiding problems of emulsion and entrainment of organic extracting agent in the aqueous phase which are disadvantages of the solvent extraction method.

According to our invention a solvent extraction process is provided for recovering uranium anions from aqueous solution which combines advantages of solvent extraction techniques with those of the ion exchange resin. The process of our invention employs an organic extracting agent which comprises an organic solvent substantially insoluble in water and a polymer of a conjugated diene and a heterocyclic nitrogen-base monomer which is a compound of the pyridine or quinoline series. Such a polymer functions as an ion exchange material but can be handled as a liquid rather than as a solid. The solids of slimes and pulps can be separated from the organic extracting agent by sedimentation, and uranium containing anions are desorbed from the extracting agent with regeneration of the ion exchange material. The polymer which acts as an ion exchange material is preferably a liquid but can also be a material which is normally solid, such as soft rubbery products which are essentially gel free, and soluble in the selected organic solvent.

It is an object of our invention to provide a method of recovering uranium from ore.

It is another object to provide a method of extracting uranium-containing ions from aqueous solution.

It is still another object of our invention to provide a solvent extraction process for recovery of soluble uranium complex anions from aqueous solution with a minimum of loss of extracting medium.

It is still another object of our invention to provide a method of extracting solubilized uranium anions from acid leach ore slurries without the necessity of first clarifying the leach liquors.

Other objects, advantages and features of our invention will be apparent to those skilled in the art from the following discussion, examples and claims.

The polymers which constitute the active ion exchange material in our organic extracting agent are polymers of one or more conjugated dienes having at least 4 carbon atoms per molecule and generally not more than 8 carbon atoms per molecule with one or more heterocyclic nitrogen-base monomers which can be represented by one of the formulas

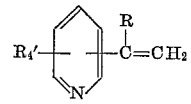

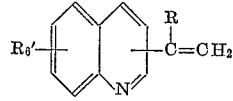

or

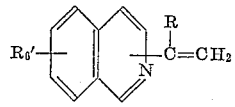

where R is hydrogen or a methyl radical and each R' is selected from hydrogen or alkyl radicals having from 1 to 12, inclusive, carbon atoms.

Representative heterocyclic nitrogen-base compounds include: 2-vinylpyridine; 2-methyl - 5 - vinylpyridine; 5-methyl-2-vinylpyridine; 3-ethyl-5-vinylpyridine; 5-ethyl-2-vinylpyridine; 4-methyl-3-vinylpyridine; 2,3,4-trimethyl-5-vinylpyridine; 2-isopropenylpyridine; 5'-propyl - 2 - isopropenylpyridine; 2-octyl-5-vinylpyridine; 5-dodecyl-2-vinylpyridine; 2-vinylquinoline; 8-ethyl - 2 - vinylquinoline; 4-hexyl-5-vinylquinoline; 1-vinylisoquinoline; 5-methyl - 1 - isopropenylisoquinoline; and the like.

Generally the heterocyclic nitrogen base monomer is a monovinyl pyridine, preferably an alkyl-substituted monovinyl pyridine. The preferred monomer is 2-methyl-5-vinylpyridine.

The preferred conjugated diene is 1,3-butadiene; however, other conjugated dienes such as isoprene, piperylene, methylpentadiene, 2,3 - dimethyl - 1,3 - butadiene, chloroprene, and the like, are suitable. Various alkoxy derivatives such as methoxybutadiene and ethoxybutadiene, as well as cyano derivatives of these conjugated diolefins can also be used.

The copolymers which are most effective contain between 0.1 and 6 weight percent, preferably between 0.2 and 5 percent by weight of nitrogen in the polymer. A still more preferred range is 1.7 to 4.7 percent nitrogen in the polymer which corresponds to a range of about 15 to 40 weight percent combined 2-methyl-5-vinylpyridine in a copolymer of 1,3-butadiene and 2-methyl-5-vinylpyridine. These polymers, as stated above, range from liquids to soft rubbery products which are essentially gel free and more specifically from liquids having a molecular weight of at least 500 to solids having a Mooney (ML–4) value of 40 or less. Rubbery products having higher Mooney values present viscosity problems when dissolved in practicable concentrations. Polymers having a molecular weight of less than 500 do not retain all the advantages of the polymeric extracting agent over conventional solvent extraction materials. The copolymers which are preferred for our purposes are liquids which have a molecular weight of at least 1,000 and a viscosity of less than 6,000 Saybolt Furol seconds at 100° F. The values for molecular weight as employed herein are determined cryoscopically.

The polymers of conjugated diene and heterocyclic nitrogen-base monomer are preferably prepared by an alkali metal catalyzed process under conditions such as that of W. W. Crouch described in United States Patent 2,631,175, issued March 10, 1953. In this polymerization process the monomer system is contacted with a finely divided alkali metal catalyst such as sodium in the presence of a suitable diluent such as benzene or heptane, or the like, at a polymerization temperature in the range of about 60 to 110° C. The amount of catalyst generally does not exceed 2 parts by weight of alkali metal per 100 parts of total monomer charged to the reactor. It is preferably in the range of 0.5 to 1.5 parts by weight of catalyst per 100 parts of monomer. Polymers which are thus prepared are liquid copolymers having a broad range of viscosity. The copolymer can also be prepared by emulsion polymerization processes to form both rubbery and liquid copolymers. The type of polymer obtained by this method can be controlled by varying the reaction conditions, such as the amount of modifier employed. Mercaptan modifiers, such as tertiary dodecyl mercaptan, in the range of about 10 to 30 weight percent based on the monomeric material will result in the formation of liquid polymers ranging from fluid to very viscous liquids. Such polymerizations are generally carried out at a temperature in the range of —40° C. to 70° C. and higher, and numerous emulsion polymerization recipes are known to be operable. The potassium persulfate initiated recipe is generally employed when polymerization is effected at a temperature above about 40° C. When the polymerization reaction is carried out at a lower temperature such as about 10° or 5° C., the more highly active initiator systems such as those containing diazo-thioether, or redox systems such as hydroperoxide-iron pyrophosphate are preferred. Recipes employing less than about 2 percent mercaptan modifier based on the weight of the monomeric material can be used to produce rubbery polymers. A typical emulsion system is shown in Table I. This recipe can give good polymerization rates at 40° F. and high yields for reaction periods in the range of 2 to 24 hours.

TABLE I

*Emulsion Polymerization Recipe*

| | Parts by weight |
|---|---|
| Conjugated diene monomer | 99–50 |
| Heterocyclic nitrogen base monomer | 1–50 |
| Water | 200 |
| Potassium soap | 5.0 |
| Potassium hydroxide | 0.05 |
| Potassium chloride | 0.2 |
| Sodium salt alkyl naphthalene sulfonic acid | 0.2 |
| Ethylenediamine tetraacetic acid | 0.04 |
| Ferrous sulfate heptahydrate | 0.02 |
| Sodium formaldehyde sulfoxylate | 0.1 |
| Paramenthane hydroperoxide | 0.1 |
| Tertiary dodecyl mercaptan | 5–25 |

The solvents which can be employed include, broadly, organic solvents which are inert, nondeleterious and liquid under the conditions of the process and which are insoluble or substantially insoluble in water. Suitable hydrocarbon solvents which are relatively inexpensive include kerosene, diesel fuel, No. 1 fuel oil, gasoline, petroleum naphtha, and other light and heavy oils of the same nature preferably having flash points above 100° F. Such solvents should be sweet to the doctor test. Other organic solvents such as aromatic hydrocarbons, ketones, esters, chlorinated solvents, and the like, can be selected depending upon their availability, cost and solvent power for the copolymer. Water insoluble alcohols can be used when the combined vinylpyridine monomer is at a relatively high value. On copolymer solubility considerations alone, the aromatic hydrocarbons, ketones, esters, and chlorinated solvents are generally preferred over aliphatic hydrocarbons. Mixtures of these solvents can also be employed and certain advantages, such as a decreased tendency to form stable emulsions, can be obtained by using aliphatic alcohols having at least 8 carbon atoms in the molecule in amounts up to about 10 weight percent in a hydrocarbon solvent. Examples of such alcohols are octyl alcohol, dodecyl alcohol and cetyl alcohol.

The amount of copolymer in the organic solvent can vary considerably but should be at least 1 percent by weight. Concentrations as high as 20 percent and higher can be employed depending, of course, upon the copolymer and solvent selected. The lower molecular weight copolymers can be employed in the higher concentrations and as a general guide concentrations should be adjusted so that the viscosity of the total extracting media does not exceed about 50 poises at 210° F.

Also within the scope of our invention is the use of copolymers which have been quaternized, preferably with an organic halide. As a general rule, such quaternization increases the polarity of the ion exchange material and thereby enhances its activity in weakly basic solutions. Thus a solvent extraction process for carbonate leach liquors is provided. Quaternization likewise tends to reduce the solubility of the copolymer in the organic solvents; therefore, in general, it is desirable to select a copolymer having a nitrogen content in the lower portion of the range given, for example, between about 0.1 to 1 weight percent nitrogen in the polymer, for quaternization. The decrease in solubility can be offset to a certain extent by selecting a quaternizing agent having a relatively large organic group.

Examples of quaternizing agents which are suitable include various halogen-substituted hydrocarbons such as halogen-substituted alkanes or cycloalkanes which contain at least one hydrogen atom attached to a carbon atom. The substituted alkanes include alkyl halides, alkylene halides and aromatic substituted halogenated alkanes. Representative cycloalkanes include 1,2-dibromocyclohexane, 1-methyl-2,3 - dichlorocyclopentane, and the like. Representative alkyl halides include methyl iodide, methyl bromide, ethyl iodide, propyl iodide, hexyl iodide, nonyl iodide, cetyl bromide, and the like. Representative alkylene halides include 1,2-dichloroethane, 1,2-dibromoethane, 1,2-dichloropropane, 1,2-dibromooctane, and the like. Representative aromatic substituted halogenated alkanes include benzyl chloride, benzal chloride, benzotrichloride, and halogenated xylenes, particularly the chlorinated xylenes such as 1,3-, 1,4-bis (trichloromethyl) benzene; 1-trichloromethyl-2-dichloromethylbenzene; 1 - trichloromethyl-4-monochloromethylbenzene, 1-dichloromethyl-3-monochloromethylbenzene; and the like. Other active quaternizing agents include the organic sulfates and the organic acid chlorides which contain not more than 20 carbon atoms per molecule and contain at least one halogen or equivalent quaternization group; for example, an alkyl aryl sulfonate, an aryl alkyl halide, an alkyl sulfate, or the like. Of the organic halides which are employed as quaternizing agents, the chlorides are preferred. One or more of these quaternizing agents can be employed in amount sufficient to react with part or all of the nitrogen units in the polymer.

The acid leaches, which are prepared by contacting finely crushed ore containing about 0.2 to 0.6 weight percent uranium as $U_3O_8$ with an aqueous solution of acids such as hydrochloric acid or sulfuric acid, generally contain, on the basis of clarified solutions, about 0.3 to 5 grams of uranium per liter. The solution of polymer and solvent is intimately contacted with the acidic aqueous leach containing the uranium complex anions by procedures which are well-known in uranium processing. The polymer solution can be washed with a suitable regenerating agent, as described below, prior to use. In batch methods the organic phase is mixed with the acidic aqueous phase using a batch countercurrent procedure which permits a high ratio of organic to aqueous phase in the zone of agitation. Phases are then separated by gravity or centrifugal force and the uranium complex desorbed from the copolymer. Contactors are employed in which mixing is done in the organic phase while the over-all flows of organic and aqueous phases are permitted to remain at any desired organic-to-aqueous ratio. In general the ratio of volume of organic phase to the aqueous phase can vary from about 10:1 to 1:10. When employing extractors having internal mixing zones which permit a high ratio of organic to aqueous phase in the zone of contact, the organic phase can be separated and recycled to achieve complete or essentially complete reaction of the polymer with the uranium complex. In still another method, a continuous countercurrent process can be applied so that the regenerated organic phase is contacted first with the nearly spent aqueous phase. When the uranium has been solubilized in the form of the complex sulfate anion, in order to achieve maximum recovery of the uranium sufficient organic phase should be utilized to provide at least four equivalents of active nitrogen absorption sites for each equivalent of uranium-containing anion.

The absorbed uranium can be recovered from the organic phase in batch or continuous operation by using desorption agents such as ammonium or sodium chloride or nitrate together with a strong mineral acid, preferably hydrochloric acid. To effect regeneration of the polymer and to effect removal of the uranium complex from the organic phase, the organic phase is mixed with a solution containing one or more of these regenerating agents in aqueous solution. The concentration of the regenerating agent should be at least 0.5 mol per liter and preferably about 1 mol per liter. Sufficient mineral acid is added to the solution to decrease the pH to a value less than 3 and preferably to adjust the pH range between 0.5 and 2.5. Solutions having about 0.05 to 0.5 mol of hydrochloric acid per liter are commonly preferred when the above-named sodium and ammonium salts are used. The concentrated aqueous solutions which are obtained are subsequently treated to effect recovery and purification of the uranium and to recover other valuable products associated with the uranium such as vanadium. The organic phase which is thus regenerated can be recycled.

As a specific embodiment of our invention a liquid copolymer is prepared using the recipe of Table I using 25 parts by weight of mercaptan with 10 parts by weight of 2-methyl-5-vinylpyridine and 90 parts by weight of 1,3-butadiene. A liquid copolymer having a molecular weight of 1500 as determined by the freezing point depression method in benzene is recovered by the common methods of coagulation, washing, and drying in a vacuum oven. Ten parts by weight of the dry, liquid copolymer is dissolved in 100 parts by weight of kerosene with vigorous agitation.

A solution is obtained by extracting uranium-containing ore with sulfuric acid. The solution has a pH of 1.0 and a uranium content (as $U_3O_8$) of about 2 grams per liter. A 200 milliliter aliquot of the uranium solution is mixed with 40 milliliters of the polymer solution and then the oil phase is recovered by decantation. The oil phase is mixed with a second 200 milliliter aliquot of uranium solution, and the oil phase again recovered.

The recovered oil phase is mixed with 10 milliliters of an aqueous solution containing 1.0 mol ammonium chloride and 0.1 mol hydrogen chloride per liter. After the salt solution has separated from the oil phase, the uranium is recovered from the aqueous solution by neutralization with ammonium hydroxide. The precipitate is recovered by filtration, washed with water and dried at 110° C. The dry residue contains more than 70 percent uranium as $U_3O_8$.

Advantages of this invention are further illustrated by the following example. The reactants, and their proportions, and other specific conditions are presented as being typical and should not be construed to limit the invention unduly.

EXAMPLE

A copolymer of 1,3-butadiene and 2-methyl-5-vinylpyridine was prepared by continuous mass polymerization in a solvent using sodium as the catalyst. The solvent was 90 percent n-heptane and 10 percent aromatic hydrocarbons of which 90 percent was toluene. The catalyst was used in an amount of 2 percent by weight of the monomers. The monomers were charged in a weight ratio of 75 parts of 1,3-butadiene to 25 parts of 2-methyl-5-vinylpyridine. The monomer to solvent ratio was 40 to 60. The reaction temperature was 200° F. and the pressure was 30 to 35 pounds per square inch gauge. The residence time in the reactor was about 1 hour. The polymer was recovered after removal of the sodium and solvent and had the following properties:

TABLE II

| | |
|---|---|
| Kinematic viscosity | 576 centistokes at 210° F. |
| Volatiles, weight percent | 0.096. |
| Ash, weight percent | 0.02. |
| Gardner color | 14. |
| Nitrogen, percent as MVP | 32.4. |

The polymer was very viscous at room temperature and the kinematic viscosity when extrapolated graphically corresponded to a viscosity of 4500 Saybolt Furol seconds at 100° F.

A standard solution was prepared by dissolving uranyl nitrate, $UO_2(NO_3)_2 \cdot 6H_2O$, in water in a concentration of 2.01 grams per liter (calculated as $U_3O_8$) and acidifying to a pH of 1.5 with sulfuric acid. To 10 milliliters was added a solution of 1 gram of the butadiene-methylvinylpyridine liquid copolymer in 30 milliliters of kerosene. The mixture was agitated for 2 minutes at room temperature. Separation into two phases was made by centrifuging. Analysis of a sample of the aqueous phase showed removal of 25.2 percent of the uranium nitrate. The remainder of the extracted aqueous solution was treated a second time in the same manner using a fresh solution of the polymer as before. Analysis showed that from the two extractions 54.5 percent of uranium salt had been removed.

It is apparent from the above example that an effective solvent extracting media is provided by our invention. Various modifications of our process will be apparent to those skilled in the art. For example, by the use of liquid copolymer, alone or in solution, extractions can be effected from immiscible organic phases as well as from aqueous solutions. Adaptations of our process for the treatment of both clarified solutions and slurries can readily be made. Other modifications are available without departing from the spirit or scope of our invention.

We claim:

1. A method of extracting uranium-containing complex anions from an aqueous leach solution which comprises contacting said leach solution with a liquid organic extracting medium comprising a liquid copolymer of an open chain aliphatic conjugated diene having from 4 to 8, inclusive, carbon atoms per molecule and a heterocyclic nitrogen-base monomer having the general formula selected from the group consisting of

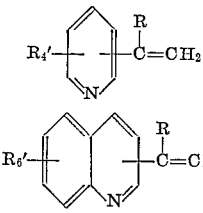

and

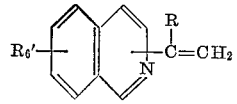

where R is selected from the group consisting of hydrogen and a methyl radical and each R' is selected from the group consisting of hydrogen and alkyl radicals having from 1 to 12, inclusive, carbon atoms, said copolymer having a nitrogen content of from 0.1 to 6 weight percent and a molecular weight of at least 500 and a viscosity of not over 6,000 Saybolt Furol seconds at 100° F., in an organic solvent which is immiscible with water and inert, nondeleterious and liquid under contacting conditions.

2. A method according to claim 1 wherein said heterocyclic nitrogen-base monomer is an alkyl-substituted monovinyl pyridine.

3. The method of claim 1, wherein said copolymer is quaternized with an organic halide containing not more than 20 carbon atoms per molecule and at least one hydrogen atom attached to a carbon atom.

4. A method of separating uranium-containing complex anions from an aqueous leach solution by solvent extraction according to claim 3 wherein said leach solution is alkaline.

5. A method of extracting uranium-containing complex anions from an aqueous acid leach solution which comprises contacting said acid leach solution with a liquid organic extracting medium comprising a liquid copolymer of an open chain aliphatic conjugated diene having from 4 to 8, inclusive, carbon atoms per molecule and an alkyl-substituted monovinyl pyridine, said alkyl group having from 1 to 12, inclusive, carbon atoms, said liquid copolymer having a molecular weight of at least 1,000 and a viscosity of not over 6,000 Saybolt Furol seconds at 100° F., and a nitrogen content of from 1.7 to 4.7 weight percent in an inert and nondeleterious liquid organic solvent which is immiscible with water.

6. The method of claim 5, wherein said copolymer is a copolymer 1,3-butadiene and from 15 to 40 weight percent of 2-methyl-5-vinylpyridine.

7. A method according to claim 6 wherein said solvent in the organic extracting medium is a hydrocarbon having a flash point above 100° F. and said extracting medium has a copolymer content of at least 1 weight percent and a viscosity of not over 50 poises at 210° F.

8. A method of extracting uranium-containing complex anions from an aqueous acid leach solution containing said anions which comprises intimately contacting said leach solution with an immiscible liquid extracting medium consisting essentially of kerosene and from 1 to 20 weight percent of sodium-catalyzed liquid copolymer of 1,3-butadiene and 2-methyl-5-vinylpyridine in solution in said kerosene, said copolymer having a combined methylvinylpyridine content in the range of 15 to 40 weight percent, a molecular weight of at least 1,000 and a viscosity of not over 6,000 Saybolt Furol seconds at 100° F.; separating said organic extracting medium from said aqueous solution and desorbing said uranium-containing anions from said extracting medium.

9. A method of extracting uranium-containing complex anions from an aqueous leach solution which comprises intimately mixing the aqueous solution containing uranium complex anions with a water-immiscible liquid organic solution comprising an inert and nondeleterious liquid organic solvent and a liquid copolymer of an open chain aliphatic conjugated diene having from 4 to 8, inclusive, carbon atoms per molecule and a heterocyclic nitrogen-base monomer having the general formula selected from the group consisting of

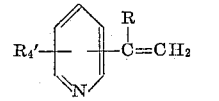

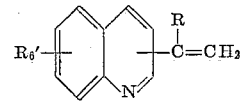

and

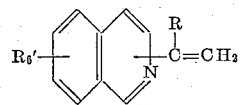

where R is selected from the group consisting of hydrogen and a methyl radical and each R′ is selected from the group consisting of hydrogen and alkyl radicals having from 1 to 12, inclusive, carbon atoms, said copolymer having a nitrogen content of from 0.1 to 6 weight percent and a molecular weight of at least 500 and a viscosity of not over 6,000 Saybolt Furol seconds at 100° F., separating the aqueous and organic phases, mixing the organic phase thus separated with an aqueous solution containing a desorption agent, separating the last mentioned aqueous and organic phases, recycling the last mentioned organic phase to the first mentioned mixing step, and precipitating uranium values from said last mentioned aqueous phase.

References Cited in the file of this patent

UNITED STATES PATENTS

| | | |
|---|---|---|
| 2,402,020 | Cislak | June 11, 1946 |
| 2,512,697 | Grotenhuis | June 27, 1950 |
| 2,597,439 | Bodamer | May 20, 1952 |
| 2,631,175 | Crouch | Mar. 10, 1953 |
| 2,683,124 | D'Alelio | July 6, 1954 |
| 2,801,224 | Greer | July 30, 1957 |
| 2,877,250 | Brown et al. | Mar. 10, 1959 |

OTHER REFERENCES

Mining Engineering, September 1957, vol. 9, No. 9, page 973.

Gaudin; International Conference on the Peaceful Uses of Atomic Energy, vol. 8, 1956, pages 10–11.